United States Patent [19]

Yaginuma et al.

[11] 3,920,769

[45] Nov. 18, 1975

[54] NOVEL COATING COMPOSITION

[75] Inventors: Hiroshi Yaginuma, Yokohama;
Takashi Suzuki, Yamato; Atutane Kimi, Yokohama, all of Japan

[73] Assignee: Nippon Zeon Co., Ltd., Tokyo, Japan

[22] Filed: Feb. 25, 1974

[21] Appl. No.: 445,235

Related U.S. Application Data

[62] Division of Ser. No. 264,466, June 20, 1972, abandoned.

[52] U.S. Cl. ....... 260/894; 260/29.7 D; 260/29.7 H
[51] Int. Cl.² ........................................ C08L 47/00
[58] Field of Search ...................... 260/894, 94.7 R

[56] References Cited
UNITED STATES PATENTS 3,205,214   9/1965   Talcott.............................. 260/894
3,442,675   5/1969   Gorke et al...................... 260/23.7

*Primary Examiner*—Murray Tillman
*Assistant Examiner*—J. Zeigler
*Attorney, Agent, or Firm*—Sherman & Shalloway

[57] ABSTRACT

A water thinnable resin coating composition comprising the product obtained by attaching an unsaturated carboxylic acid or its anhydride to a blend comprising 90 – 40% by weight of polybutadiene having at least 60% cis-configuration and a number average molecular weight of 500 – 20000 and 10 – 60% by weight of polypentadiene having at least 70% trans-configuration and a number average molecular weight of 500 – 20000 by addition reaction, and neutralizing the reaction product.

6 Claims, No Drawings

NOVEL COATING COMPOSITION

This application is a divisional application from Hiroshi Yaginuma, et al., Ser. No. 264,466 filed June 20, 1972, now abandoned.

This invention relates to a novel coating composition, and more particularly to a coating composition comprising liquid cis-polybutadiene and liquid trans-polypentadiene which have been modified.

Paints are usually classified into oil and enamel paints such as air-drying paints and baking paints, and water thinnable paints such as electrodeposition paints. In the past, most of the commercially available oil and enamel paints contained as film-forming material a natural drying oil consisting mainly of glycerides of linoleic acid, linolenic acid, oleic acid, ricinolec acid, etc., or a stand oil prepared therefrom. Since these paints have defects in their resistance to chemicals, surface gloss, storage stability, etc. and their quality was not always constant, studies on the use of synthetic oils in place of natural oils as raw materials for paints have been carried on. Lately, with the progress in the development of cis-polybutadiene rubber, liquid cis-polybutadiene was obtained and this was found to be very superior as a paint (see U.S. Pat. No. 3,442,675). According to this process, by using cis-polybutadiene having a viscosity at 20°C. of 30 – 30000 centipoises, epoxidized polybutadiene, polybutadiene which has undergone Diels-Alder addition reaction or polybutadiene to which an unsaturated compound containing a carboxylic acid group and/or a carboxylic anhydride group has been added as film-forming material of paint, a synthetic paint having a high drying speed and superior gloss and color tone can be obtained. This paint, however, had some faults in hardness and impact resistance, and improvement of these defects was sought.

Lately, the electrodeposition coating technique has been given attention and put to practical use, and research on water thinnable paints, centered on electrodeposition paints, has been vigorously carried out. Electrodeposition coating roughly comprises a process for the preparation of a watersoluble resin, an electrodeposition process and a stoving process, and only a combination of these processes and the film-forming material can produce coated articles having superior coating performance, and if the combination of the film-forming material with even one of the three processes is not appropriate, it becomes difficult to produce useful coated articles. Of them all, the film-forming material and the process for the preparation of a water-soluble resin, and the film-forming material and the electrodeposition process, have an inseparable relationship, and this has been recognized widely among those skilled in the art.

The substances hitherto used as film-forming material contain an acid group which is neutralized by bases to be dispersible or soluble in water. Typical examples are maleic linseed oil, maleic dehydrated castor oil, fumaric tung oil, maleic acid-modified hydroxypolybutadiene having a hydroxyl group at the end of or in the molecular chain, maleic acidmodified polybutadiene containing 1,2-bonds of not less than 80%, but since all of them lack adaptability to the process for the preparation of a water-soluble resin and/or the electrodeposition process, none of them gives satisfactory coating performance.

The present inventors first attempted to use as the film-forming material of water thinnable paint liquid cispolybutadiene which had been used as an air-drying paint having superior resistance to solvents and water, but no satisfactory result could be obtained, gel formation occurred conspicuously as side reaction in the process for the preparation of a watersoluble resin, and a certain defect in throwing power was caused in the electrodeposition process.

After further ardent studies on improving the synthetic paint prepared from liquid cis-polybutadiene, however, it was discovered that the above defects can be eliminated by blending liquid cis-polybutadiene with liquid trans-polypentadiene without impairing the merits of cis-polybutadiene, and this discovery led to the present invention.

The principal object of the present invention is to provide a synthetic coating composition having superior surface gloss, impact resistance, resistance to water and solvents and hardness and a high drying speed. Another object of the present invention is to provide an improved water thinnable coating composition for which the synthesis of water soluble resin can easily be carried out and which has superior electrodeposition characteristics and coating film performance.

According to the present invention, a composition which contains as film-forming material a mixture comprising 90 – 40% by weight of polybutadiene having at least 60% of cis-configuration and a number average molecular weight of 500 – 20000 and 10 – 60% by weight of polypentadiene having at least 70% of trans-configuration and a number average molecular weight of 500 – 20000, and an aqueous composition which contains as the film-forming material a product obtained by making the above mixture water-soluble in the conventional manner, are provided as paint compositions thereby realizing foregoing objects.

The cis-polybutadiene used in the present invention contains at least 60% of cis-configuration and has a number average molecular weight of 500 – 20000, preferably 1000 – 10000, and is usually produced by polymerizing butadiene in the presence of a Ziegler catalyst consisting essentially of an organoaluminum halide and a nickel compound (see, for example, specifications of U.S. Pat. No. 3,329,734 and Japanese Patent Publication No. 20495/71), but the process for its preparation is not limited to such process. If the cis-configuration is less than 60%, the resultant paint has poor drying property, and if the number average molecular weight is less than 500, the drying property becomes poor and the coating film is liable to cause shrinkage, and there is no practical means for preventing it. On the other hand, if the number average molecular weight exceeds 10,000, its viscosity increases and it is easily gelled upon heating, and as a result it can not be put to practical use as a paint. Especially when it is used for a water thinnable paint, it is preferable to make its number average molecular weight not more than 5000, preferably not more than 3000 from the viewpoint of preventing gel formation in the synthesis of the water soluble resin.

The trans-polypentadiene used is a liquid polymer containing at least 70% of trans-configuration and having a number average molecular weight of 500 – 20,000, preferably 1000 – 10000. This can easily be prepared by polymerizing 1,3-pentadiene in a homogeneous system using a Friedel-Crafts catalyst such as solubilized aluminum chloride, boron trifluoride, or a complex thereof, tin tetrachloride, organoaluminum dihalide or sulphuric acid, but no particular limitation is placed on the process for its preparation. Further, trans-polypentadiene copolymerized with a small amount of other olefins such as butene-1, 2-methylbutene-2, butadiene and isoprene may also be used in the present invention. The reason why the trans-configuration content is limited is that if it is less than 70%, hardness is not improved and the throwing power as an electrodeposition paint lowers. The reason why the molecular weight is limited is the same with that set forth for the case of cis-polybutadiene. In case it is used for water thinnable paints, it is preferable to make the number average molecular weight not more than 5000, preferably not more than 3000, for the prevention of decrease of water-solubility.

In the present invention, the mixing ratio of polybutadiene to polypentadiene is one of the important technical means constituting the invention, and superior effects can be obtained only when 90 – 40% by weight, preferably 80 – 60% by weight, of polybutadiene and 10 – 60% by weight, preferably 20 – 40% by weight, of polypentadiene are used. If the amount of polypentadiene exceeds 60% by weight, the flexibility, impact resistance, resistance to water and solvents, etc., of the product become poor, and if it is less than 10% by weight, neither hardness nor impact resistance can be improved. Further, when it is less than 10% by weight, there is a defect that gel formation occurs when an unsaturated acid such as maleic anhydride is added to the polymer to make it water soluble. Moreover, the water thinnable paint thus prepared exhibits poor electrodeposition characteristics such as water spotting, throwing power and performance of the coating film.

Since the polymers used in the present invention are both liquid polymers, they can easily be blended together, and, if desired, the blend may be modified by known means before use. For example, adhesive strength can be increased by epoxidizing 1 – 50%, preferably 5 – 20% of the double bonds of the polymers according to known procedure, and a self-fire-extinguishing film can be obtained by reacting the blend with hexachlorocyclopentadiene according to the Diels-Alder addition reaction. Further, an unsaturated compound containing a carboxylic acid group and/or a carboxylic acid anhydride group may be attached to the polymers according to known procedure, and when the additive has an acid value of 1 – 200, the strength of bonding to the coated surface, pigment-wetting property and affinity to compounds having a polar group of the coating composition can be improved. Further, the polymer containing a carboxylic acid group and/or a carboxylic acid anhydride group may be blended with a compound having a functional group, such as acid amide group, an amine group, and isocyanate group or a hydroxyl group, which reacts chemically with the above functional groups, coated on the surface of a substrate and thereafter reacted together.

Further, the polymers of the present invention may be reacted with an unsaturated carboxylic acid or an unsaturated carboxylic anhydride at a temperature of 50°– 300°C., preferably 150°– 200°C., for 5 minutes – 10 hours, preferably 1 – 5 hours, and thereafter the reaction product can be neutralized with 0.5 – 1.5 molar equivalents of an inorganic alkali, an alkali salt or an amine to make it soluble or dispersible in water. The unsaturated carboxylic acid or unsaturated caboxylic acid anhydride is used in an amount of 5 – 100 parts by weight per 100 parts by weight of the polymer, and a minimum amount is usually that required for making the reaction product water-soluble by neutralization. It is preferable to carry out the reaction after polybutadiene is blended with polypentadiene, and thereby the gelation of polybutadiene is remarkably restrained. At the time of reaction, an anti gelling agent such as tertiary-amyl hydroquinone, hydroquinone, diphenylamine, 2,6-ditertiarybutyl-4-methylphenol or a copper compound may be used in an amount of 0.01 – 5% by weight based on the polymer, if necessary. The unsaturated carboxylic acid or unsaturated carboxylic acid anhydride used may be any known compound, and for example, acrylic acid, methacrylic acid, crotonic acid, maleic acid, citraconic acid, fumaric acid and other $\alpha,\beta$-unsaturated carboxylic acids, and maleic anhydride, citraconic anhydride may be mentioned, but from the viewpoints of quality and economy, maleic acid anhydride is preferably used. At this time, a catalyst for accelerating the reaction may also be used, if necessary, for example, a radical generating agent which decomposes at a temperature below the reaction temperature such as ditertiary-butyl peroxide, lauroyl peroxide, benzoyl peroxide, tertiary-butyl hydroperoxide, peroxylauric acid or perbenzoic acid may be used. Further, to decrease the viscosity and make the reaction smooth, a solvent inert in the reaction such as benzene or toluene may be used as diluent. As the amine to be used to neutralize the reaction product, widely known amines such as ethanolamine, diethanolamine, triethanolamine, dimethylamino ethanol, diethylamino ethanol, trimethylamine, N-methylmorpholine, 2-amino-2-methyl-1-propanol, 2-amino-2-methyl-1-propanol, 2-amino-2-methyl-1,3-propanediol and tris(-hydroxymethyl)aminomethane may be mentioned. Alkalis such as ammonia water, caustic soda and caustic potash, and alkali salts such as ammonium carbonate, sodium carbonate and potassium carbonate may also be used for the neutralization. The water-soluble or -dispersible product thus obtained is usually used as a water thinnable paint after its aqueous solution or dispersion having a concentration of 10 – 25% by weight is prepared, and its pH is adjusted to about 7.5 – 8.5.

The coating composition of the present invention may also be diluted with a conventional diluent to use it as common paint. A pigment, a filler, etc., may be added as desired, when the composition is used as oil and enamel paint or water thinnable paint. The oil and enamel paint thus prepared shows superior drying property, and can be used widely as a paint having superior hardness, impact resistance, resistance to solvents and waterproofness. The electrodeposition coating film formed by this water thinnable paint shows, after drying superior gloss, flexibility, impact resistance, Ericksen durability test value, waterproofness and resistance to solvents.

The following referential examples and Examples are given for the purpose of explaining the present invention in more detail. Parts here means parts by weight, unless otherwise specified. In each Table, the marks O, Δ and X mean "good," "ordinary" and "poor," respectively.

REFERENTIAL EXAMPLE 1

By polymerizing 1,3-butadiene in butene-1-solvent using a catalyst composed of diethylaluminum chloride, nickel naphthenate and water, samples of liquid polybutadiene having the below-mentioned properties were prepared.

|  | Sample | | |
| --- | --- | --- | --- |
|  | A | B | C |
| Number average molecular weight | 1600 | 3200 | 5700 |
| Molecular structure | | | |
|   Cis-form (%) | 79.0 | 83.9 | 90.1 |
|   Trans-form (%) | 19.9 | 14.9 | 7.7 |
|   Vinyl-form (%) | 1.1 | 1.2 | 2.2 | mill, and after it was confirmed with a particle gauge that the particles were less than 10 microons in size, coating with a brush was performed once in an amount of 1g/dm². After the coating was baked for 30 minutes in a hot blast-circulating oven heated at 180°C., the resultant film was tested according to JIS-K-5400. For comparison's sake, commercial liquid 1,2-polybutadiene (number average molecular weight 2140, 1,2-configuration 91.2%, product of Nippon Soda Co., Ltd.) was put to the same test.

The results were as shown in Table 1.

Table 1

| | | Run No. | | | | | |
| --- | --- | --- | --- | --- | --- | --- | --- |
| | Control | Examples of the present invention | | | | Control | |
| | 1 | 2 | 3 | 4 | 5 | 6 | 7 |
| Sample B (parts) | 100 | 90 | 70 | 50 | 30 | — | — |
| Sample D (parts) | — | 10 | 30 | 50 | 70 | 100 | — |
| Liquid 1,2-polybutadiene (parts) | — | — | — | — | — | — | 100 |
| Appearance (smoothness and gloss) | 0 | 0 | 0 | 0 | X | X | 0 |
| Flexibility test | | | | | | | |
|  (cylindrical mandrel apparatus) (4 mm) | 0 | 0 | 0 | 0 | X | X | X |
|  (cylindrical mandrel apparatus) (2 mm) | X | 0 | 0 | 0 | X | X | X |
| Pencil hardness | B | HB | HB | HB | H | H | H |
| Cross cut value | 70 | 80 | 70 | 70 | 50 | 50 | 80 |
| Du Pont impact resistance *1 | X | 0 | 0 | 0 | X | X | X |
| Ericksen value (mm) | 7.2 | 7.7 | 8.6 | 8.0 | 4.0 | could not be measured | 2.0 |
| Water resistance *2 | 0 | 0 | 0 | 0 | X | X | 0 |
| Solvent resistance *3 | 0 | 0 | 0 | 0 | X | X | 0 |
| (Anti-corrosiveness (salt water spraying) | Rust spots | Rust spots | No irregularties | Rust spots | Rust spots | Rust spots | Rust spots |

*1 Du Pont impact resistance: ½ inch × 500 g × 50 cm.
*2 Water resistance: Immersed in water at 20°c. for 3 days.
*3 Solvent resistance: Immersed in No. 2 naphtha at 20°C. for 2 days.

REFERENTIAL EXAMPLE 2

By polymeriziing 1,3-pentadiene using boron trifluoride ethyl etherate as the catalyst, samples of liquid polypentadiene having the below-mentioned properties were prepared.

|  | Sample | |
| --- | --- | --- |
|  | D | E |
| Number average molecular weight | 1500 | 6300 |
| Molecular structure | | |
|   Cis-form (%) | 8.0 | 6.5 |
|   Trans-form (%) | 90.0 | 91.0 |
|   Vinyl-form (%) | 2.0 | 2.5 |

EXAMPLE 1

The cis-polybutadiene (sample B) having a number average molecular weight of 3200 prepared in referential example 1 was blended with the polypentadiene (sample D) having a number average molecular weight of 1500 prepared in referential example 2 at ratios shown in Table 1, and then 40 parts of this blend were blended with 60 parts of rutile type titanium white. The resultant blend was dispersed for 2.5 hours in a ball From the above results, it is found that the paint of the present invention is superior in hardness and impact strength as compared with the paint using cis-polybutadiene as the film-forming material, and is superior in flexibility, impact resistance and Ericksen durability test value as compared with the paint using 1,2-polybutadiene as the film-forming material.

EXAMPLE 2

The polybutadiene (sample C) having a number average molecular weight of 5700 prepared in referential example 1 was blended with the polybutadiene (sample D) having a number average molecular weight of 1500 prepared in referential example 2 at ratios shown in Table 2, and then 1.0 part, as lead, of lead naphthenate and 0.1 part, as nickel, of nickel naphthenate were added to 100 parts of the blend and the mixture was blended adequately. The resultant paint composition was coated on a clean test piece of glass or tin-plate to a thickness of 1 mil (1/1000 inch) with a doctor knife, the coating film was allowed to stand at a temperature of 20°C. and a relative humidity of 75%, and its drying property was tested at regular intervals of time. After the film hardened, it was further allowed to stand for a week, and was tested according to JIS-K-5400. The results were as shown in Table 2.

Table 2

| | | Run No. | | | | |
| --- | --- | --- | --- | --- | --- | --- |
| | Control | Examples of the present invention | | | Control | |
| | 8 | 9 | 10 | 11 | 12 | 13 |
| Sample C (parts) | 100 | 90 | 70 | 50 | 30 | — |
| Sample D (parts) | — | 10 | 30 | 50 | 70 | 100 |
| Drying time | | | | | | |
|   Set to touch (hrs) | <0.5 | <0.5 | <0.5 | <0.75 | <2.0 | <2.0 |

Table 2-continued

|  | Control | | Run No. Examples of the present invention | | Control | |
| --- | --- | --- | --- | --- | --- | --- |
| Semi-cured (hrs) | <0.75 | <0.75 | <0.75 | <1.0 | <4.0 | <4.0 |
| Cured (hrs) | <18 | <18 | <18 | <18 | <48 | <72 |
| Flexibility test (cylindrical mandrel apparatus) | | | | | | |
| 4 mm in diameter | 0 | 0 | 0 | 0 | X | X |
| 2 mm in diameter | X | Δ | 0 | Δ | X | X |
| Pencil hardness | 6B | 2B | B | B | 2B | 3B |
| Cross cut value | 40 | 50 | 50 | 50 | 30 | 20 |
| Impact resistance test (du Pont) | X | 0 | 0 | 0 | X | X |
| Ericksen value (mm) | 9.0 | 9.4 | 10.0 | 9.0 | 8.2 | 3.4 |
| Water | 0 | 0 | 0 | 0 | X | X |
| Solvent resistance | 0 | 0 | 0 | 0 | X | X |
| Anti-corrosiveness (salt water spraying) | Rust spots | Rust spots | No irregularities | Rust spots | Rust spots | Rust spots |

From the above results, it is found that the paint of the present invention has a drying property equivalent to that of the paint using cis-polybutadiene as the film-forming material.

EXAMPLE 3

The polybutadiene (Sample B) having a number average molecular weight of 3200 prepared in referential example 1 was blended with the polypentadiene (Sample E) having a number average molecular weight of 6300 prepared in referencial example 2 at the ratios shown in TAble 3, and this blend was further blended with lead naphthenate and nickel naphthenate of the same recipe as in Example 2. The resultant paint composition was coated on a substrate in the same manner as in Example 2, and the film was tested according to JIS-K-5400. The results were as shown in Table 3.

Table 3

|  | Control 14 | Run No. Example of the present invention 15 | Control 16 |
| --- | --- | --- | --- |
| Sample B (parts) | 100 | 70 | — |
| Sample E (parts) | — | 30 | 100 |
| Flexibility test | | | |
| (4 mm) | X | 0 | X |
| (2 mm) | X | Δ | X |
| Pencil hardness | 6B | B | 2B |
| Cross cut value | 40 | 50 | 20 |
| Impact resistance test (du Pont) | X | 0 | X |
| Ericksen value (mm) | 8.4 | 9.3 | 3.7 |
| Water resistance | 0 | 0 | X |
| Solvent resistance | 0 | 0 | X |
| Anti-ocrrosiveness (salt water spraying) | Rust spots | Not irregularities | Rust spots |

From the above results, it is found that the paint of the present invention is superior in flexibility, hardness, du Pont impact resistance and Ericksen durability, hardness, du Pont impact resistance and Ericksen durability test value as compared with the paint using cis-polybutadiene as the film-forming material.

EXAMPLE 4

The polybutadiene (Sample A) having a number average molecular weight of 1600 prepared in referential Example 1, the polypentadiene (Sample D) having a number average molecular weight of 1500 prepared in referential Example 2, linseed oil and liquid 1,2-polybutadiene (number average molecular weight 2140, 1,2-bond content 91.2%, product of Nippon Soda Co., Ltd.) were blended together at the ratios shown in Table 4. A glass container provided with a thermometer, a stirrer, a reflux condenser and a conduit for letting a gas in was charged with 100 parts of the polymer blend and 20 parts of maleic anhydride, and then purged with gaseous nitrogen. While passing gaseous nitrogen thereinto, the contents were heated to 60°C. to melt maleic anhydride. After maleic anhydride was melted, the contents were heated to 200°C. with stirring, and the reaction was continued at 200°C. for 4 hours. A small amount of sample was taken out of the reactor, and put to a spot color reaction test to ascertain if any maleic anhydride remained. The result was negative except in the case of Run No. 24 where 1,2-polybutadiene was used. The solubility of the sample in butyl cellosolve, toluene and carbon tetrachloride was examined to confirm if any gel formation had occurred.

After this test, the contents were cooled, and when the internal temperature lowered to about 60°C., 15 parts of butyl cellosolve were added to 85 parts of the contents from which gel, if any, had been removed, and after mixing them well, the acid value of the blend was measured. 0.8 equivalent, based on this acid value, of triethanolamine was added thereto, and mixed well. By adding ion exchange-purified water thereto, a water soluble, thermosetting resin composition having a resin content of 20% was produced. After the composition was allowed to stand overnight, its water-insoluble gel was removed through a 80-mesh wire gauge, its solids content was measured, and the calculated amount of pure water was added thereto to adjust the solids content at 15%. It pH value was measured, and it was found that the value fell within the range of 7.5 – 8.5. Using this liquid, an electrodeposition test was conducted under the following conditions.

Electrodeposition at constant voltage:
  80 volts.
Time of deposition:
  2 minutes.
Distance between cathode and anode :
  7 cm.
Anode surface area :
  195 $cm^2$ (0.8 mm × 65 mm × 150 mm phosphoric acidtreated iron plate).
Stirring :
  Done.
Bath temperature :
  25°C.

After passage of electricity was discontinued, the test piece thus electropainted was taken out, powerful water spray was applied to the coating film surface to remove the adhering electrodeposition liquid, and then the test piece was air-dried for 3 hours in a chamber at a temperature of 25°C. and a relative humidity of 75%. Thereafter, its water spotting was judged. Then, the air-dried test piece was placed in a hot blast-circulating oven at 180°C. for 30 minutes to cure the coating film, which was put to a coating film performance test according to JIS-K-5400. The test results were as shown in Table 4.

practical use, and linseed oil gives inferior results with respect to throwing power and impact resistance. The films of the present invention generally show superior properties such as gloss, smoothness, flexibility, pencil hardness, impact resistance and water resistance solvent resistance.

Table 4

| | Control 17 | Examples of the present invention 18 | 19 | 20 | 21 | Control 22 | 23 | 24 |
|---|---|---|---|---|---|---|---|---|
| Sample A (parts) | 100 | 90 | 70 | 50 | 30 | — | — | — |
| Sample D (parts) | — | 10 | 30 | 50 | 70 | 100 | — | — |
| Linseed oil (parts) | — | — | — | — | — | — | 100 | — |
| Liquid 1,2-polybutadiene (parts) | — | — | — | — | — | — | — | 100 |
| Gelatin in maleinization reaction | | | | | | | | |
| Butyl cellosolve | not dissolved | Dissolved | Dissolved | Dissolved | Dissolved | Dissolved | Dissolved | Dissolved |
| Toluene | " | " | " | " | " | " | " | " |
| Carbon tetrachloride | " | " | " | " | " | " | " | " |
| Acid value (mg-KOH/g-polymer) | 35 | 88 | 90 | 92 | 95 | 95 | 95 | 42 |
| Electrodeposition characteristics | | | | | | | | |
| Washability | — | Excellent | Excellent | Excellent | Excellent | Excellent | Good | very bad |
| Water spotting | — | Good | Good | Good | Good | Good | Good | Water spots |
| Throwing power (%) | — | 80 | 100 | 100 | 100 | 100 | 80 | 50 |
| Properties of deposited film | | | | | | | | |
| Smoothness and gloss | — | Excellent | Excellent | Excellent | Bad | Bad | Good | Very bad |
| Film thickness ($\mu$) | — | 25 | 25 | 25 | 15 | 10 | 25 | 15 |
| Flexibility (100 mm) | — | 0 | 0 | 0 | X | X | 0 | X |
| Flexibility (2 mm) | — | 0 | 0 | 0 | X | X | 0 | X |
| Pencil hardness | — | HB | HB | HB | HB | HB | HB | H |
| Cross cut value | — | 90 | 100 | 100 | 100 | 80 | 90 | 90 |
| Impact resistance test (du Pont) (½ × 1000 g × 50 cm) | — | 0 | 0 | 0 | X | X | X | X |
| Ericksen value (mm) | — | 7.2 | 10.0 | 9.6 | 4.1 | 2.9 | 7.2 | 4.5 |
| Water resistance | — | 0 | 0 | 0 | X | X | 0 | 0 |
| Solvent resistance | — | 0 | 0 | 0 | Δ | X | X | X |
| Anti-corrosiveness (salt water spraying) | — | Rust spots | Good | Good | Rust spots | Rust spots | Good | Good |

From the above Table, it is found that when cis-polybutadiene is used as the film-forming material, gelation of the polymer occurs during the maleinization reaction, and it is difficult to make it water-soluble. If a known antigelling agent such as copper naphthenate is added and a similar treatment is given, the baked coating film shows stickness and this is not desirable, and it shows inferior pencil hardness and resistance to solvents as compared with control examples. In the Examples of the present invention, gel formation does not occur, and films of superior washability, spotting and throwing power are obtained. Since maleinized 1,2-polybutadiene having a number average molecular weight of 2140 gives very inferior washability when treated under the same conditions, this is not fit for

EXAMPLE 5

The polybutadiene (Sample B) having a number average molecular weight of 3200 prepared in referential Example 1 was blended with the polypentadiene (Sample D) having a number average molecular weight of 1500 prepared in referential example 2 at ratios shown in Table 5, and then subjected to the same procedure as in Example 4. The electrodeposition characteristics and the properties of the deposited film were examined. The results were as shown in Table 5.

Table 5

| | Control 25 | Examples of the present invention 26 | 27 | 28 | Control 29 |
|---|---|---|---|---|---|
| Sample B (parts) | 100 | 90 | 70 | 50 | — |
| Sample D (parts) | — | 10 | 30 | 50 | 100 |
| Gelation in maleinization reaction | Recognizable | Hardly recognizable | Not recognizable | Not recognizable | Not recognizable |
| Electrodeposition characteristics | — | Good | Good | Good | Good |
| Condition of deposited film | — | Good | Excellent | Excellent | Bad |
| Film thickness | — | 20 | 25 | 25 | 10 |
| Balance among pencil hardness, du Pont impact resistance and Ericksen value | — | Excellent | Excellent | Excellent | Bad |

On comparing Run No. 26 (Table 5) with Run No. 18 (Table 4), it is found that as the molecular weight of cispolybutadiene becomes larger, the tendency of gel formation in the maleinization reaction becomes stronger. "Excellent" balance among pencil hardness, du Pont impact resistance and Ericksen value means that all these properties are superior to those of conventionally used electropainting compositions.

We claim:

1. A water thinnable resin coating composition comprising the product obtained by reacting at a temperature of 50° – 300°C. for a period of 5 minutes to 10 hours, an unsaturated carboxylic acid or its anhydride selected from the group consisting of acrylic acid, methacrylic acid, crotonic acid, maleic acid, citraconic acid, fumaric acid, maleic anhydride and citraconic anhydride with a blend comprising 90 – 40% by weight of polybutadiene having at least 60% cis-configuration and a number average molecular weight of 500 – 20000 and 10 – 60% by weight of polypentadiene prepared by polymerizing 1,3-pentadiene in a homogeneous system using a Friedel-Crafts catalyst having at least 70% transconfiguration and a number average molecular weight of 500 – 20000 by addition reaction, and neutralizing the reaction product.

2. A water thinnable resin coating composition comprising the product obtained by reacting at a temperature of 50°– 300°C. for a period of 5 minutes to 10 hours, an unsaturated carboxylic acid or its anhydride selected from the group consisting of acrylic acid, methacrylic acid, crotonic acid, maleic acid, citraconic acid, fumaric acid, maleic anhydride and citraconic anhydride with a blend coomprising 80 – 60% by weight of polybutadiene having at least 60% cis-configuration and a number average molecular weight of 500 – 20000 and 20 – 40% by weight of polypentadiene prepared by polymerizing 1,3-pentadiene in a homogeneous system using a Friedel-Crafts catalyst having at least 70% trans-configuration and a number average molecular weight of 500 – 20000 by addition reaction, and neutralizing the reaction product.

3. A water thinnable resin coating composition comprising the product obtained by reacting at a temperature of 50°– 300°C. for a period of 5 minutes to 10 hours, an unsaturated carboxylic acid or its anhydride selected from the group consisting of acrylic acid, methacrylic acid, crotonic acid, maleic acid, citraconic acid, fumaric acid, maleic anhydride and citraconic anhydride with a blend comprising 90 – 40% by weight of polybutadiene having at least 60% cis-configuration and a number average molecular weight of 500 – 5000 and 10 – 60% by weight of polypentadiene prepared by polymerizing 1,3-pentadiene in a homogeneous system using a Friedel-Crafts catalyst having at least 70% trans-configuration and a number average molecular weight of 500 – 5000 by addition reaction, and neutralizing the reaction product.

4. A water thinnable resin coating composition comprising the product obtained by reacting at a temperature of 50°– 300°C. for a period of 5 minutes to 10 hours, an unsaturated carboxylic acid or its anhydride selected from the group consisting of acrylic acid, methacrylic acid, crotonic acid, maleic acid, citraconic acid, fumaric acid, maleic anhydride and citraconic anhydride with a blend comprising 80 – 60% by weight of polybutadiene having at least 60% cis-configuration and a number average molecular weight of 500 – 5000 and 20 – 40% by weight of polypentadiene prepared by polymerizing 1,3-pentadiene in a homogeneous system using a Friedel-Crafts catalyst having at least 70% trans-configuration and a number average molecular weight of 500 – 5000 by addition reaction, and neutralizing the reaction product.

5. A water thinnable resin coating composition comprising the product obtained by reacting at a temperature of 50°– 300°C. for a period of 5 minutes to 10 hours, an unsaturated carboxylic acid or its anhydride selected from the group consisting of acrylic acid, methacrylic acid, crotonic acid, maleic acid, citraconic acid, fumaric acid, maleic anhydride and citraconic anhydride with a blend comprising 90 – 40% by weight of polybutadiene having at least 60% cis-configuration and a number average molecular weight of 500 – 3000 and 10 – 60% by weight of polypentadiene prepared by polymerizing 1,3-pentadiene in a homogeneous system using a Friedel-Crafts catalyst having at least 70% trans-configuration and a number average molecular weight of 500 – 3000 by addition reaction, and neutralizing the reaction product.

6. A water thinnable resin coating composition comprising the product obtained by reacting at a temperature of 50°– 300°C. for a period of 5 minutes to 10 hours, an unsaturated carboxylic acid or its anhydride selected from the group consisting of acrylic acid, methacrylic acid, crotonic acid, maleic acid, citraconic acid, fumaric acid, maleic anhydride and citraconic anhydride with a blend comprising 80 – 60% by weight of polybutadiene having at least 60% cis-configuration and a number average molecular weight of 500 – 3000 and 20 – 40% by weight of polypentadiene prepared by polymerizing 1,3-pentadiene in a homogeneous system using a Friedel-Crafts catalyst having at least 70% trans-configuration and a number average molecular weight of 500 – 3000 by addition reaction, and neutralizing the reaction product.

* * * * *